US006554492B2

(12) United States Patent
Gilliland et al.

(10) Patent No.: US 6,554,492 B2
(45) Date of Patent: Apr. 29, 2003

(54) ADDRESSABLE TRANSCEIVER MODULE (75) Inventors: Patrick B. Gilliland, Chicago, IL (US); Evgueniy D. Anguelov, River Grove, IL (US)

(73) Assignee: Stratos Lightwave, Chicago, IL (US)

( * ) Notice: Subject to any disclaimer, the term of this patent is extended or adjusted under 35 U.S.C. 154(b) by 148 days.

(21) Appl. No.: 09/873,052

(22) Filed: Jun. 1, 2001

(65) Prior Publication Data

US 2002/0181894 A1 Dec. 5, 2002

(51) Int. Cl.[7] ................................................ G02B 6/36
(52) U.S. Cl. ........................ 385/88; 385/92; 359/152; 359/163; 439/76.1
(58) Field of Search ..................... 385/88, 92; 359/152, 359/163; 439/76.1

(56) References Cited

U.S. PATENT DOCUMENTS

| | | | | |
|---|---|---|---|---|
| 5,037,308 A | * | 8/1991 | Bryce et al. ................... | 439/52 |
| 5,187,605 A | * | 2/1993 | Shikata et al. ............... | 359/152 |
| 5,237,441 A | * | 8/1993 | Nhu ............................ | 359/152 |
| 6,179,627 B1 | * | 1/2001 | Daly et al. .................. | 439/76.1 |
| 6,241,534 B1 | * | 6/2001 | Neer et al. .................. | 439/76.1 |
| 6,447,326 B1 | * | 9/2002 | Teach et al. ................. | 439/460 |

OTHER PUBLICATIONS

US patent application Publication 2002/0067528 A1; Loddoch et al.; Optical Transceiver; Jun. 6, 2002.*

* cited by examiner

Primary Examiner—Brian Healy
Assistant Examiner—Daniel Petkovsek
(74) Attorney, Agent, or Firm—Steven M. Evans (57) ABSTRACT

An optoelectronic transceiver module having a housing with a first opening at a first end and a second opening at a second end, a printed circuit board mounted within the housing, an electrical connector on the printed circuit board at the first end of the optoelectronic transceiver module, the electrical connector having an insulative mating surface within the first opening and including a first side with electrical contacts in an area oriented substantially parallel to the first side of the insulative mating surface, wherein the electrical contacts slidingly engage a circuit card connector of a host receptacle in order to quickly install and remove the optoelectronic transceiver module from within the circuit card connector, an optical assembly on the printed circuit board at the second end of the optoelectronic transceiver module, the optical assembly including a transmitting optical subassembly and a receiving optical subassembly, the second opening allowing the optical assembly to communicate outside of the housing in order for the optical assembly to be coupled with a duplex fiber optic plug providing for bi-directional data transmission over an optical data link, a data storage module within the housing having a configurable address corresponding to the address of the optoelectronic transceiver module and address contacts electrically connected to at least some of the electrical contacts of the electrical connector, thereby enabling a host receptacle to communicate with the address contacts of the data storage module via the electrical contacts of the electrical connector in order to determine an address of the optoelectronic transceiver module.

20 Claims, 13 Drawing Sheets

(PRIOR ART)

Fig. 2  Conventional GBIC Module
(PRIOR ART)

Fig. 3

MOD_DEF(0:2)

| Mod Def | MOD_DEF(0) pin 4 | MOD_DEF(1) pin 5 | MOD_DEF(2) pin 6 | Interpretation by host | Ref. |
|---|---|---|---|---|---|
| 0 | NC | NC | NC | GBIC not present | clause 5.2 |
| 1 | NC | NC | TTL LOW | Copper Style 1 or Style 2 connector 1.0625 Gbd, 100-TW-EL-S or 100-TP-EL-S, active inter-enclosure connection and IEEE802.3 1000BASE-CX | Annex A |
| 2 | NC | TTL LOW | NC | Copper Style 1 or Style 2 connector 1.0625 Gbd, 100-TW-EL-S or 100-TP-EL-S, active or passive intraenclosure connection | Annex B |
| 3 | NC | TTL LOW | TTL LOW | Optical LW, 1.0625 Gbd 100-SM-LC-L | Annex C |
| 4 | TTL LOW | SCL | SDA | Serial Module definition protocol | clause 5.2.1 annex D |
| 5 | TTL LOW | NC | TTL LOW | Optical SW, 1.0625 Gbd 100-M5-SN-I or 100-M6-SN-I or | Annex E |
| 6 | TTL LOW | TTL LOW | NC | Optical LW, 1.0625 Gbd 100-SM-LC-L and similar to 1.25 Gbd IEEE802.3z 1000BASE-LX single mode | Annex F |
| 7 | TTL LOW | TTL LOW | TTL LOW | Optical SW, 1.0625 Gbd 100-M5-SN-I or 100-M6-SN-I and 1.25 Gbd 1000BASE-SX IEEE 802.3z | Annex G |

*Fig. 4* (PRIOR ART)

Conventional GBIC to host connector pin assignment

| Pin Name | Pin # | Sequence | Sequence | Pin # | Pin Name |
|---|---|---|---|---|---|
| RX_LOS | 1 | 2 | 1 | 11 | RGND |
| RGND | 2 | 2 | 1 | 12 | -RX_DAT |
| RGND | 3 | 2 | 1 | 13 | +RX_DAT |
| MOD_DEF(0) | 4 | 2 | 1 | 14 | RGND |
| MOD_DEF(1) | 5 | 2 | 2 | 15 | VddR |
| MOD_DEF(2) | 6 | 2 | 2 | 16 | VddT |
| TX_DISABLE | 7 | 2 | 1 | 17 | TGND |
| TGND | 8 | 2 | 1 | 18 | +TX_DAT |
| TGND | 9 | 2 | 1 | 19 | -TX_DAT |
| TX_FAULT | 10 | 2 | 1 | 20 | TGND |

*Fig. 5*   (PRIOR ART)

Addressable GBIC to Host connector pin assignment

| Pin Name | Pin # | Sequence | Sequence | Pin # | Pin Name |
|---|---|---|---|---|---|
| RX_LOS | 1 | 2 | 1 | 11 | RGND |
| RGND | 2 | 2 | 1 | 12 | -RX_DAT |
| AddR(0) | 3 | 2 | 1 | 13 | +RX_DAT |
| MOD_DEF(0) | 4 | 2 | 1 | 14 | RGND |
| MOD_DEF(1) | 5 | 2 | 2 | 15 | VddR |
| MOD_DEF(2) | 6 | 2 | 2 | 16 | VddT |
| TX_DISABLE | 7 | 2 | 1 | 17 | AddR(2) |
| AddR(1) | 8 | 2 | 1 | 18 | +TX_DAT |
| TGND | 9 | 2 | 1 | 19 | -TX_DAT |
| TX_FAULT | 10 | 2 | 1 | 20 | TGND |

ADDRESSABLE TRANSCEIVER MODULE

FIELD OF THE INVENTION

The present invention relates generally to removable serial transceiver modules, and more particularly, to an addressable gigabit interface converter (GBIC) having a distinctive address.

BACKGROUND OF THE INVENTION

Removable serial transceiver modules, such as GBICs, are designed to provide gigabaud capability for Fibre Channel (FC) and other protocols that use similar optical fiber links. In general terms, the GBIC provides an interface between a serial duplex optical interface, such as an FC port, and a serial duplex electrical device such as a serializer/deserializer (SERDES). The electrical connector specified for a GBIC is a 20-pin Single Connector Attachment (SCA-20), which is a male ribbon style connector. GBICs are designed to be "hot-pluggable," meaning the host receptacle can remain powered on during installation of a GBIC. More detailed information of the GBIC is provided in the "SFF Committee Proposed Specification for GBIC (Gigabit Interface Converter)," Revision 5.5, dated Sep. 27, 2000, which is hereby incorporated by reference.

A host system generally includes one or more host receptacles, usually mounted to a host printed circuit board (PCB). Once a GBIC is installed into a host receptacle, the host system identifies the specific type of GBIC by reading the module definition of the GBIC. The module definition of a GBIC is indicated by three (3) module definition pins, which are pins #4, #5, and #6 within the electrical connector of the GBIC. These three pins enable eight (8) different binary module definitions to be identified. For example, module definition "0" indicates that no GBIC is present, module definition "1" indicates a copper style GBIC with an active inter-enclosure connection, module definition "3" indicates an optical 1300 nanometer GBIC, etc.

Module definition 4 is somewhat unique. GBIC module definition 4 specifies a serial definition protocol. If the host system detects module definition 4, the serial protocol may then be activated. When the serial protocol is activated, the serial clock signal (SCL) is generated by a host controller, which is contained within the host system. A GBIC having a module 4 definition provides access to sophisticated identification information that describes the GBIC's capabilities, standard interfaces, manufacturer, and other information.

According to the GBIC specification, the serial interface uses a modified two-wire I²C™ protocol (trademarked by Phillips Corporation) to access the information stored in an E²PROM. The protocol requires the master I²C™ bus host controller to send a device address, which is one byte (8 bits) long, followed by a word address. The word address is also one byte long and is used to access a specific address in the E²PROM. The size of the word address (one byte) determines the maximum number of directly addressable words in the memory as $2^8=256$. Each memory address contains one byte of information, so the maximum capacity is 2K bits. If the E²PROM has only one-kilobit capacity, the Most Significant Bit (MSB) of the address word is disregarded.

The device address word is eight bits long. The first four MSBs contain a mandatory one zero sequence followed by three bits for device/page addressing. The eighth bit of the word determines the type of operation as a Read (one) or Write (zero).

The three device/page addressing bits of the Device Address Word allow up to eight 1K/2K E²PROMs to be connected simultaneously to the I²C™ bus or fewer 4K/8K/16K E²PROMs. The 1K/2K E²PROMs have three hardwire pins, which establish its address. Each of these pins is usually hardwired to Ground or Power, or connected to hardware, which provides the address. Every time a device address word is sent, the three address pins are being compared to the information on the corresponding input address pins. After comparing the device address, the E²PROM will output a zero. If a comparison is not made, the chip will remain in a standby state.

The 4K/8K/16K E²PROMs use some or all three address/page bits in order to access different pages in its memory. Thus, there can be no more than four 4K, or two 8K, or one 16K E²PROMs connected to a single bus.

Pursuant to the GBIC Specification, the address select pins for the serial CMOS E²PROM are set to zero. As discussed above, the zero address is achieved by internally hard-wiring all the address pins of the CMOS E²PROM to ground ($V_{IL}$ low level).

While the type of GBIC connected to a specific host receptacle can be readily identified by the host system, multiple GBICs connected to the same host system cannot be readily distinguished from each other. As previously stated, all GBICs are specified to have an address of zero by grounding the address pins of the serial CMOS E²PROM. Since all GBICs have an address of zero, a host system cannot distinguish between multiple GBICs connected to the same I²C™ serial communication bus. The conventional technique for a host system to distinguish between multiple GBICs is to provide separate wiring for each GBIC. Conventional GBICs cannot be distinguished on a common I²C™ serial communication bus because multiple conventional GBICs would have the same address.

If GBICs could be addressable with unique addresses, then a single host system could accommodate multiple GBICs. Furthermore, multiple GBICs could share a common serial communication bus. Such a common bus could accommodate multiple GBICs that could be accessed by a single host controller. Moreover, using a common bus to access multiple GBICs reduces hardware by eliminating individual wiring necessary to access conventional, non-distinct GBICs. Such a reduction eliminates up to 14 I/O pins on an 8-port media access controller chip by consolidating eight 2-wire interfaces into a single 2-wire serial communication bus.

Accordingly, there is a need for an addressable GBIC whose address can be varied to provide a unique address.

OBJECTS AND SUMMARY OF THE INVENTION

An object of the present invention is to provide a transceiver module, such as a GBIC, having a variable, distinct address that is set by a host receptacle.

A second object of the present invention is to provide an addressable GBIC that can be inputted into a conventional host receptacle designed to receive a conventional GBIC.

A further object of the present invention is to enable a host receptacle to accommodate an addressable GBIC according to the present invention with only minimal modifications.

In that regard, the present invention provides an optoelectronic transceiver module, comprising a housing having a first opening at a first end and a second opening at a second end; a printed circuit board mounted within the housing; an electrical connector on the printed circuit board at the first end of the optoelectronic transceiver module, the electrical connector having an insulative mating surface within the first opening and including a first side with electrical contacts in an area oriented substantially parallel to the first side of the insulative mating surface, wherein the electrical contacts slidingly engage a circuit card connector of a host receptacle in order to quickly install and remove the optoelectronic transceiver module from within the circuit card connector; an optical assembly on the printed circuit board at the second end of the optoelectronic transceiver module, the optical assembly including a transmitting optical subassembly and a receiving optical subassembly, the second opening allowing the optical assembly to communicate outside of the housing in order for the optical assembly to be coupled with a duplex fiber optic plug providing for bi-directional data transmission over an optical data link; and a data storage module within the housing having a configurable address corresponding to the address of the optoelectronic transceiver module and address contacts electrically connected to at least some of the electrical contacts of the electrical connector, thereby enabling a host system to communicate with the address contacts of the data storage module via the electrical contacts of the electrical connector in order to set an address of the optoelectronic transceiver module.

BRIEF DESCRIPTION OF THE DRAWINGS

FIG. 1b is a bottom view of the GBIC housing shown in FIG. 1a;

FIG. 1d is an end view of the GBIC housing shown in and taken along line 1d—1d of FIGS. 1a and 1b;

FIG. 1e is an end view of the GBIC housing shown in and taken along line 1e—1e of FIGS. 1a and 1b;

DETAILED DESCRIPTION OF THE PRESENTLY PREFERRED EMBODIMENTS

Referring now to the drawings, FIGS. 1a–1e show an outer housing 10 for a conventional GBIC 13 module (FIG. 3), capable of incorporating the present invention. A top 12, bottom 14, and sides 16, 18 are illustrated. A first end 20 and a second end 22 are located at opposing ends of the housing 10. An electrical connector 28, such as a 20-pin Single Connector Attachment (SCA), is located at the first end 20 and configured to mate with a host receptacle. An optical connector 30 is located at the second end 22.

Guide tabs 34 are located on the first end 20 to facilitate inserting the electrical connector 28 into a host receptacle and also provide grounding. Guide slots 36 are included for properly positioning the GBIC housing 10 during insertion into a host receptacle. Release levers 38 are located on sides 16 and 18 in order to secure the GBIC housing 10 within a host receptacle, and then release the GBIC housing 10 from a host receptacle in response to finger grips 40 on the release levers 38 being depressed inward toward the GBIC housing 10. A metal screw 42 on the top 12 of the housing 10 secures the top 12 and bottom 14 of the housing 10 together by screwing into an aperture 44 in the bottom 14 of the housing 10.

Figure 1A:
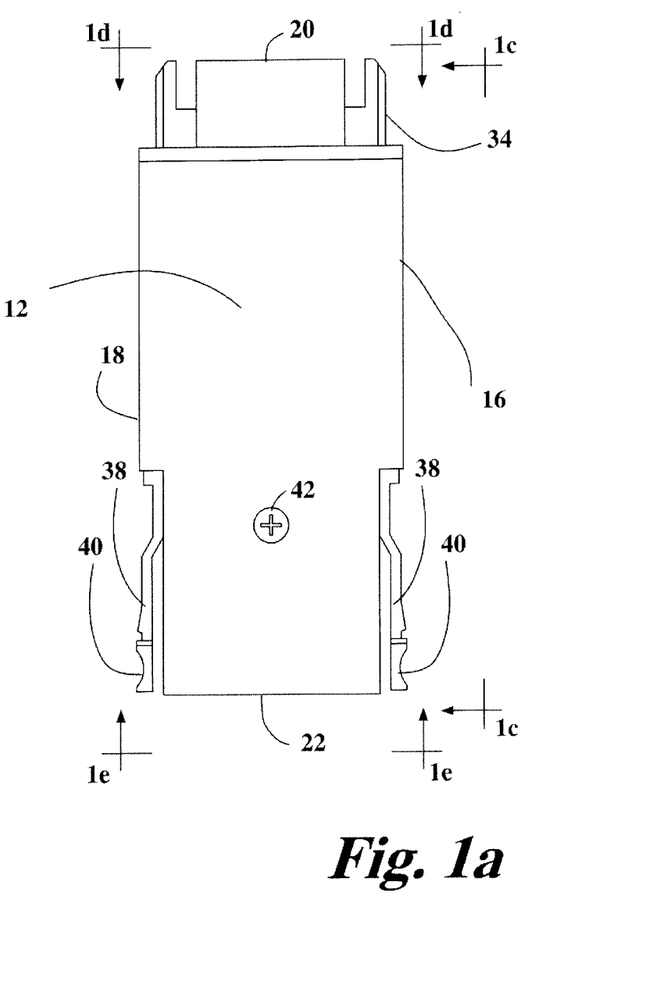
FIG. 1a is a plan view of the outer housing of a conventional GBIC.
Figures 1B, 1D, 1E:
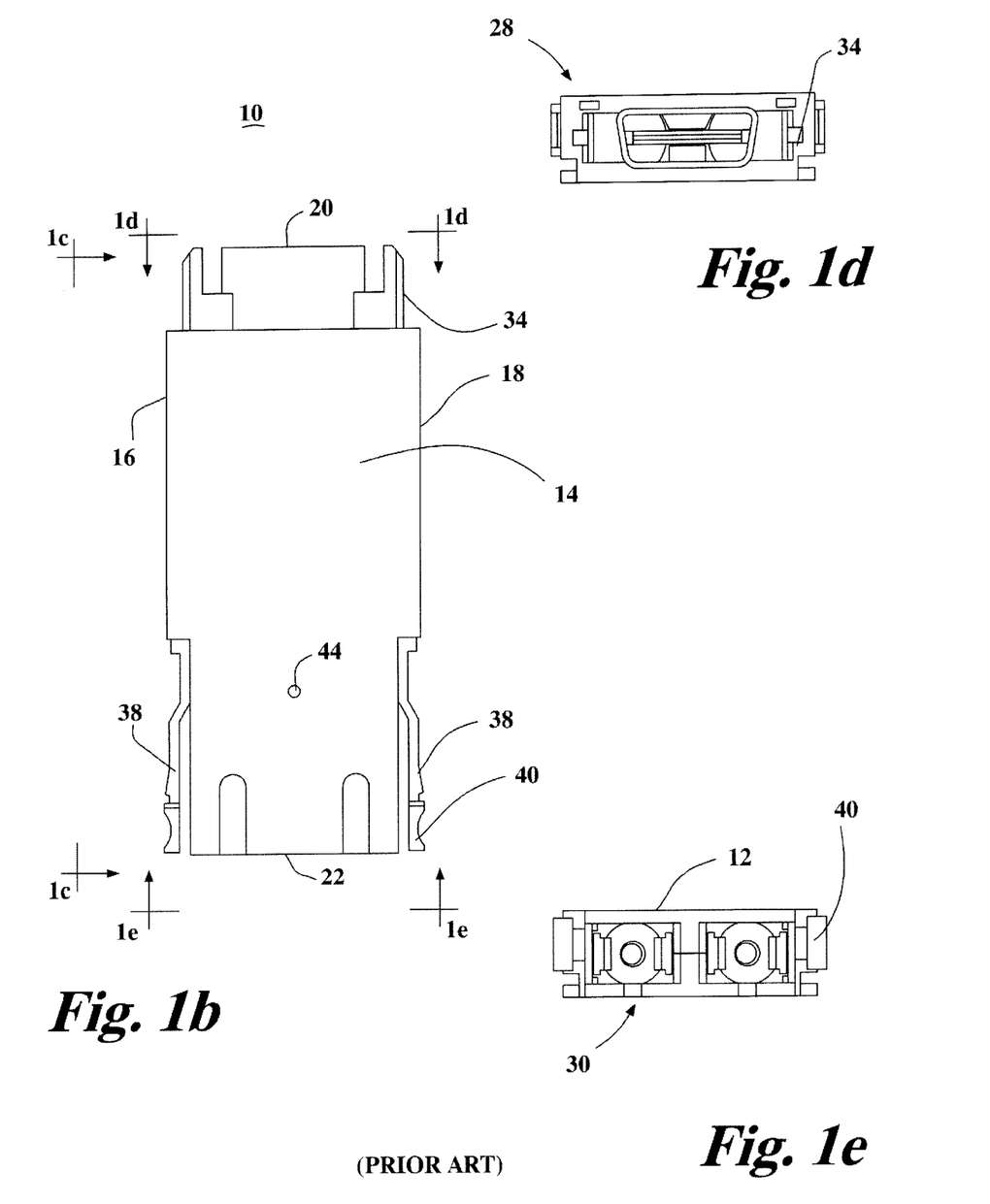
Figure 1C:
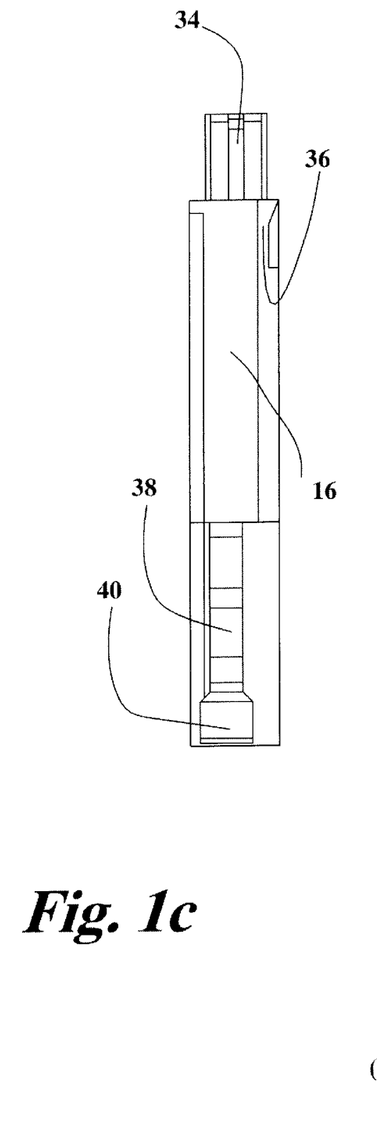
FIG. 1c is a side view of the GBIC housing shown in and taken along line 1c—1c of FIGS. 1a and 1b.
Figure 2:
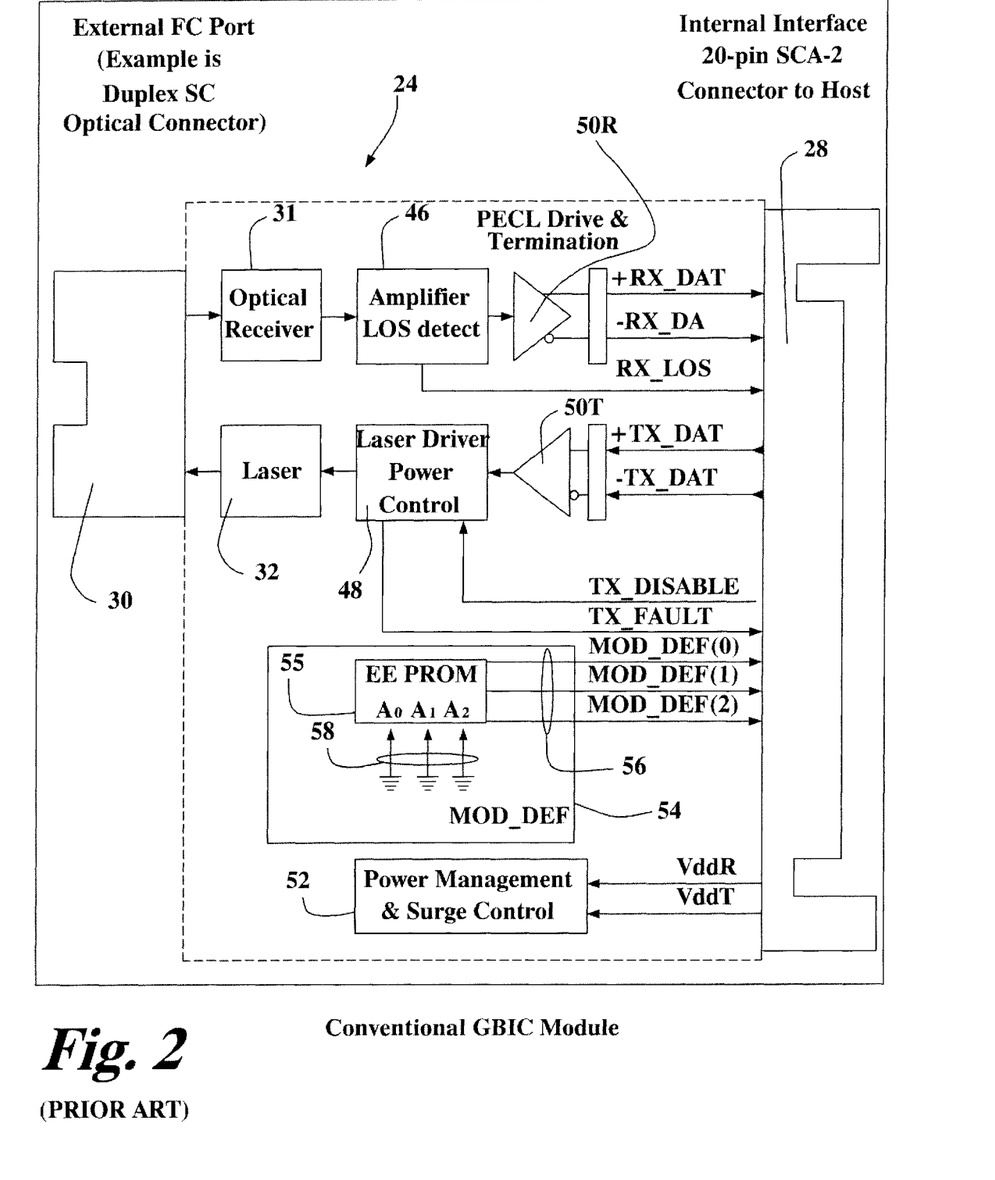
FIG. 2 is a circuit block diagram of a conventional GBIC module.

FIG. 2 is a circuit block diagram of a prior art GBIC assembly 24 of a GBIC module 13. The GBIC assembly 24 is located within the GBIC housing 10 to form a GBIC module 13. Shown are the electrical connector 28 and the optical connector 30. The optical connector 30 is connected to an optical receiver 31 and the optical transmitter (laser) 32 to an external fiber media. An amplifier equipped with loss-of-signal (LOS) detector circuitry 46 is coupled to the optical receiver 31, and a laser driver and automatic power control circuit 48 is coupled to an optical transmitter 32. A Positive Emitter Coupled Logic (PECL) drive circuit 50T, a receiver termination circuit 50R, and a power management and surge control circuit 52 are also illustrated. The power management and surge control circuit 52 distributes power to all circuits internally and protects against external power transient events.

Significant to the present invention is the E$^2$PROM 55, located within the module definition (MOD_DEF) circuit 54, which stores the module definition (MOD_DEF) of the GBIC module 13. Output lines 56 (MOD_DEF (0:2)) are connected to the electrical connecter 28 and read directly by the host system after the GBIC module 13 is connected to the host receptacle. As discussed above, the module definition (0–7) indicates to the host system the particular attributes of a GBIC module. Address lines 58 (A$_0$, A$_1$, A$_2$) are shown internally hardwired to ground, in accordance with the prior art and known GBIC standards. By hardwiring all address lines 58 to ground, the address of the GBIC module 13 is zero, in accordance with the prior art and known GBIC standards.

Figure 3:
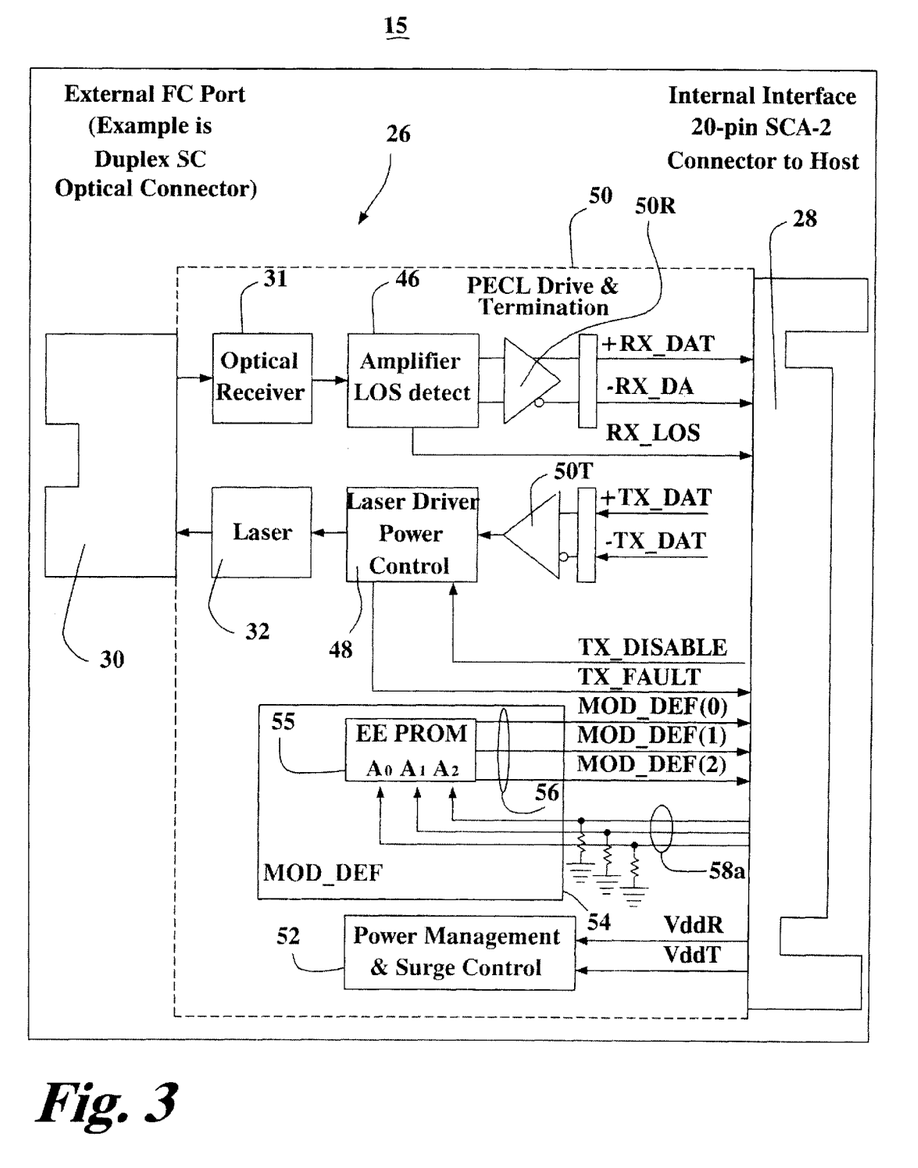
FIG. 3 is a circuit block diagram of a GBIC module configured in accordance with the present invention.

FIG. 3 is a circuit block diagram of a GBIC circuit assembly 26 for a GBIC module 15 configured in accordance with the present invention. FIG. 3 is similar to FIG. 2, except the address lines 58a of the E$^2$PROM 55 in the MOD_DEF circuit 54 are connected directly to the electrical connector 28, and the address lines 58a are not internally hard-wired to ground, as done in the prior art. In this manner, a host receptacle can determine the assignments (0 or 1) of each of the address lines 58a, thereby assigning an address (0–7) for the GBIC module 15. In accordance with the invention, the GBIC module 15 is provided with a variable address that can be assigned by the host receptacle. Furthermore, the address lines 58a utilize pin numbers 3, 8, and 17 of the electrical connector 28. This aspect will be explained in further detail in regard to FIGS. 5 and 6.

Figure 4:
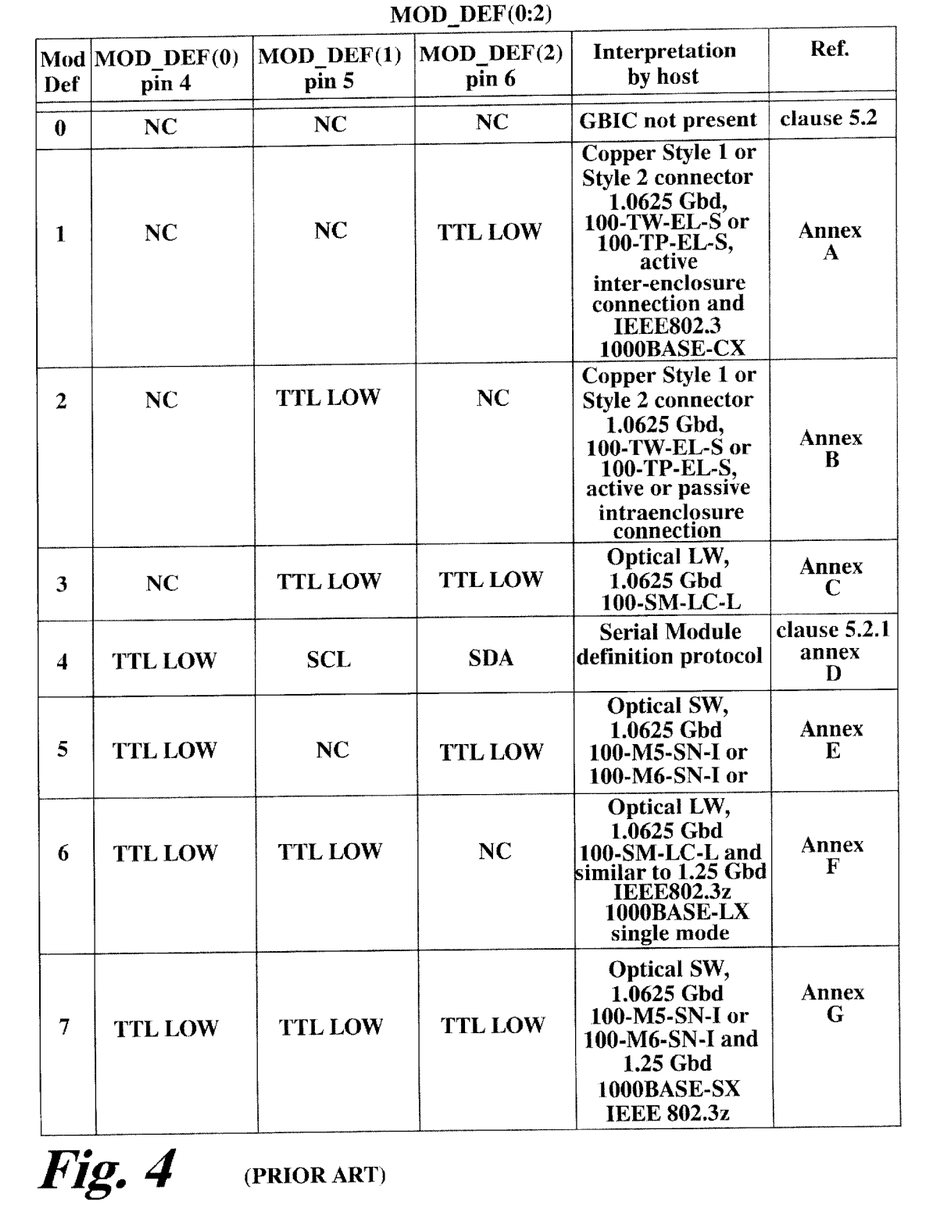
FIG. 4 is a table illustrating module definitions for a conventional GBIC.

FIG. 4 illustrates the prior art GBIC module configurations corresponding to each of the eight (0–7) GBIC module configurations. The MOD_DEF (0:2) shown in FIG. 4 are set forth according to known GBIC standards. A GBIC module configured in accordance with the present invention is designated as a module definition 4. Module definition 4 alerts a host system that additional, special information is contained in the memory of the GBIC module 13 which may be downloaded through the provided I²C bus. The serial data (SDA) and serial clock (SCL) lines of the bus are connected to pin #6 and pin #5, respectively, of the electrical connector 28. The serial clock line (SCL) on pin #5 of the electrical connector clocks in the serial data on serial data line on pin #6. In accordance with the present invention, the host system can determine if a GBIC module is an addressable GBIC module 15, and obtain part or all of the information stored in the memory of the GBIC module.

Figure 5:
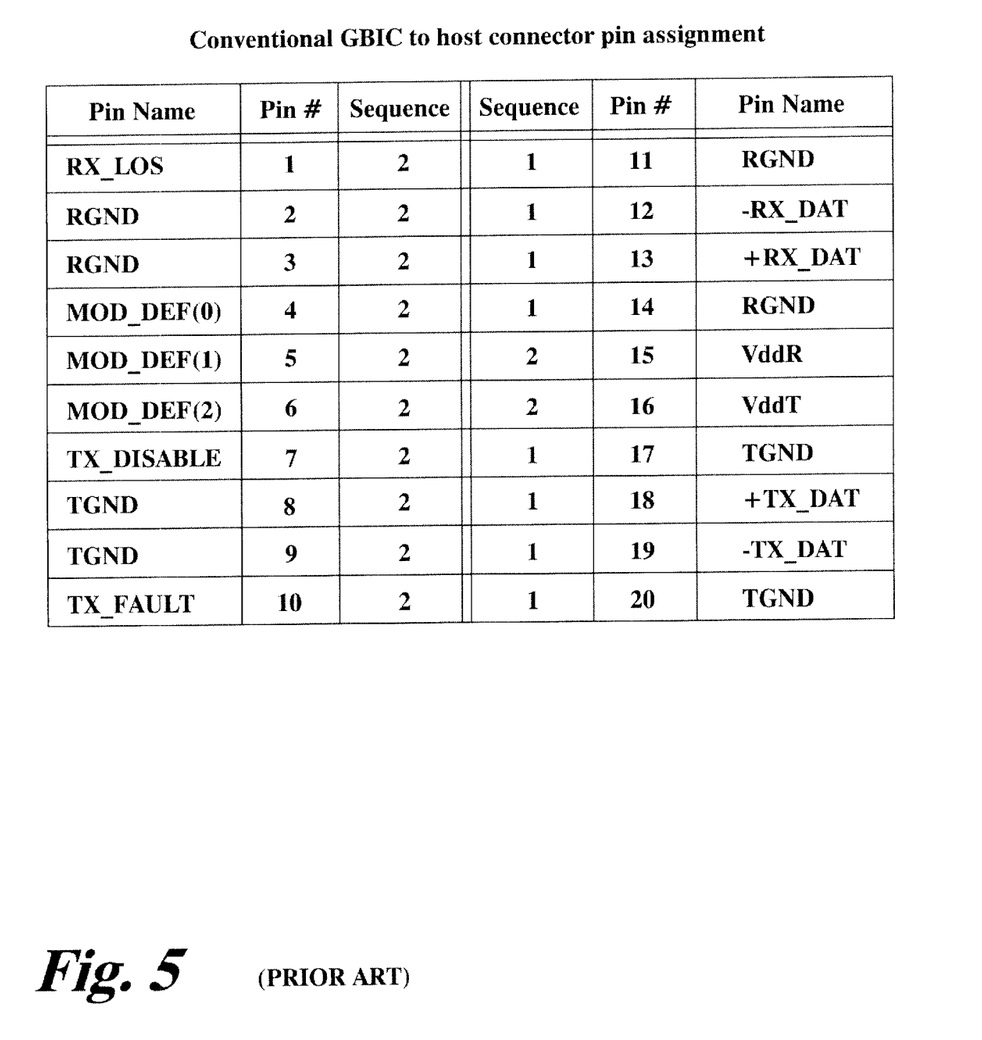
FIG. 5 is a table illustrating external pin assignments of a conventional GBIC.

FIG. 5 is a table illustrating the conventional GBIC-to-host receptacle connector pin assignments. These pin assignments are set forth and known according to the prior art GBIC standard. The 20 pins correspond to 20 conductive traces on the electrical connector 28 of the GBIC module 13. It should be noted that pins numbered 2, 3, 11, and 14 are all connected to receiver ground (RGND). Pins numbered 8, 9, 17, and 20 are all connected to transmitter ground (TGND).

Figure 6:
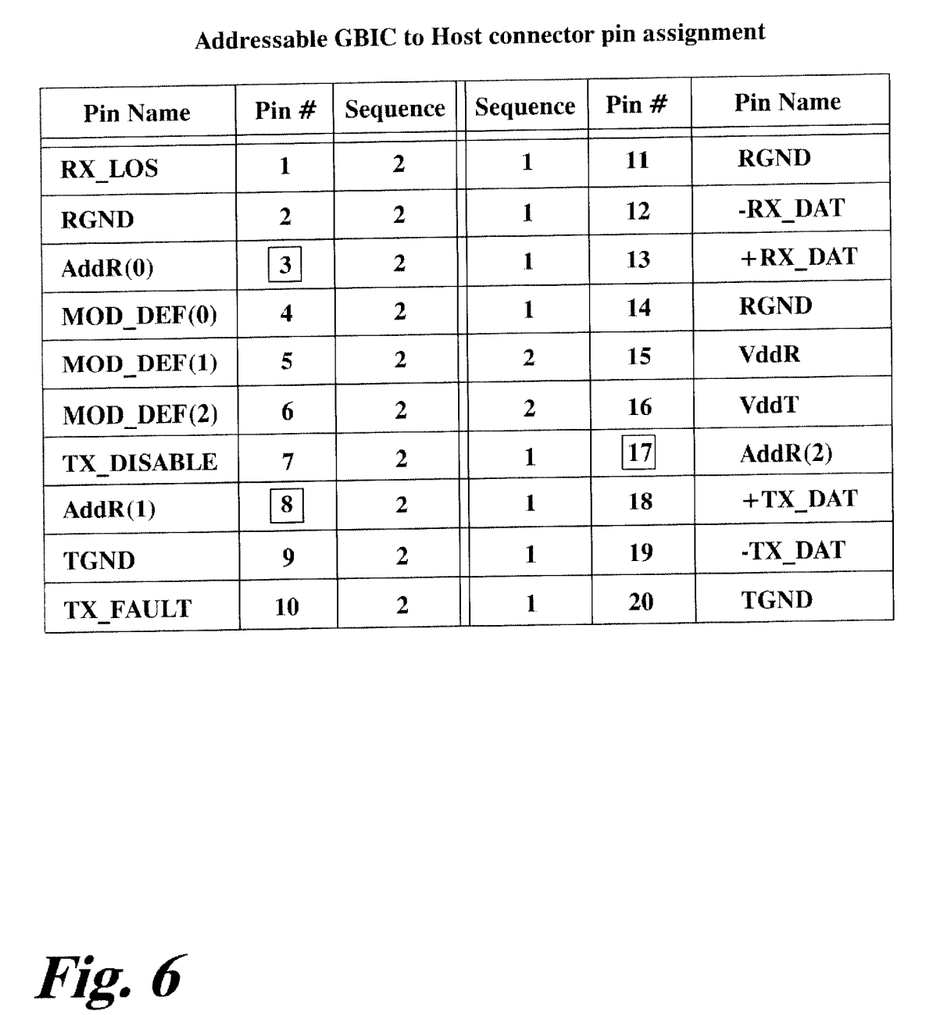
FIG. 6 is a table illustrating external pin assignments of a GBIC configured in accordance with the present invention.

FIG. 6 is a table illustrating pin assignments of a GBIC module 15 configured in accordance with the present invention. Pins or contacts #3, #8, and #17 have been reassigned to be electrically connected to the addresses $A_0$, $A_1$, $A_2$, respectively, of the address lines 58a. RGND is still connected to pins 2, 11 and 14, and one of the ground tabs 34, and TGND is still connected to pins 9, 20 and the second ground tab 34. (In some embodiments TGND and RGND can be connected to both or a common ground tab 34). Due to the redundancy of RGND and TGND pin connection, pins 3, 8 and 17 can be utilized for other functions without affecting the ability to provide connections for RGND and TGND of a GBIC. By connecting pins 3, 8, and 17 to address lines $A_0$, $A_1$, $A_2$, respectively, the host receptacle can communicate and assign the address lines 58a of a GBIC via the electrical connector 28, a feature not possible in the prior art.

It should be noted that the assignment of address lines $A_0$, $A_1$, $A_2$ to pins #3, #8 and #17 is arbitrary. It is possible that other pins could be assigned to address lines 58a. The inventors have just chosen to designate these pins in the preferred embodiment of their invention.

Figures 7A, 7B:
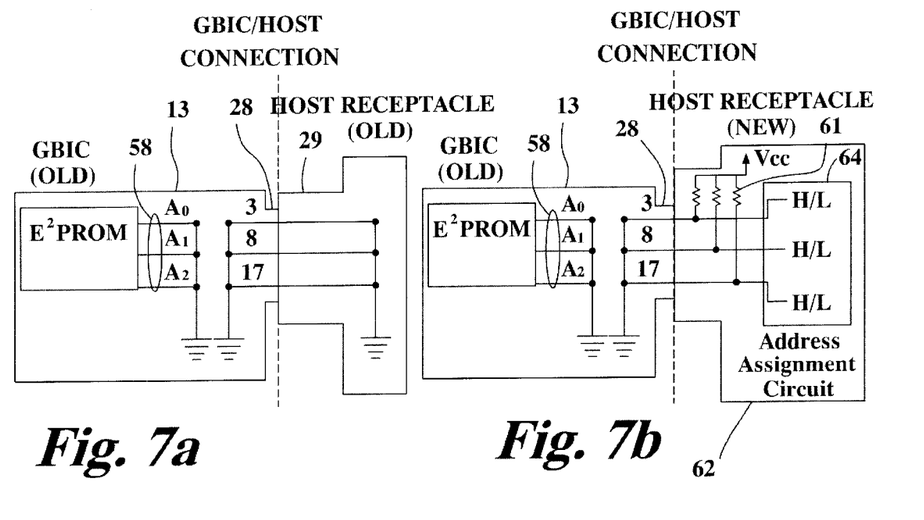
FIG. 7a is circuit block diagram illustrating a portion (pins #3, #8, and #17) of the interface connection between a conventional GBIC and a conventional host receptacle.
FIG. 7b is a circuit block diagram illustrating a portion (pins #3, #8, and #17) of the interface connection between a conventional GBIC and a host receptacle configured in accordance with the present invention.

FIG. 7a shows a connection of pins (or contacts or lines) #3, #8, #17 between a prior art GBIC module 13 and a prior art host receptacle 29. The address lines 58 of the EEPROM are shown internally tied to ground, thus setting an unchangeable, hard-wired address of zero. Pins #3, #8, #17 of the electrical connector 28 are connected to the prior art or old host receptacle 29 which in turn also grounds pins #3, #8, #17.

FIG. 7b illustrates a connection of pins #3, #8, #17 between a prior art GBIC module 13 and a host receptacle 62 configured in accordance with the present invention. The host receptacle 62 includes an address assignment circuit (AAC) 64. The AAC 64 is preferably hard-wired connections that determine an address for a connected GBIC module. The AAC 64 can set the address lines 58 which are connected to pins #3, #8, #17 of a GBIC module 15 of the present invention to the desired logic levels of the operator. In this manner, an addressable GBIC module 15 could be set to have a desired address. Of course, in the configuration shown in 7b, the GBIC module 13 is of conventional design, so the address lines 58 are already hard-wired to ground or logic zero. Thus, the host receptacle 62 cannot change the address of a prior art GBIC module 13. However, FIG. 7b illustrates that a host system configured with receptacles 62 in accordance with the present invention can receive a prior art GBIC module 13 without any damage. Furthermore, the module definition and information contained in the EEPROM 54 would inform the host system that the GBIC module 13 is a prior art design.

The host receptacle 62 is configured in accordance with the present invention. The small modification to the host receptacle 62 includes resistors 61 which are connected between each of the lines for pins #3, #8, and #17 of the host receptacle 62 and power (Vcc) or logic high. The resistors 61 assist in setting the address of a GBIC module by pulling lines for pins #3, #8 and #17 high when a logic "1" desired, but do not prevent the host receptacle 62 from pulling any of the lines #3, #8, #17 down when a logic "0" is desired on a specific line. Resistors 61 are in the range of 5–10K ohms.

Figures 7C, 7D:
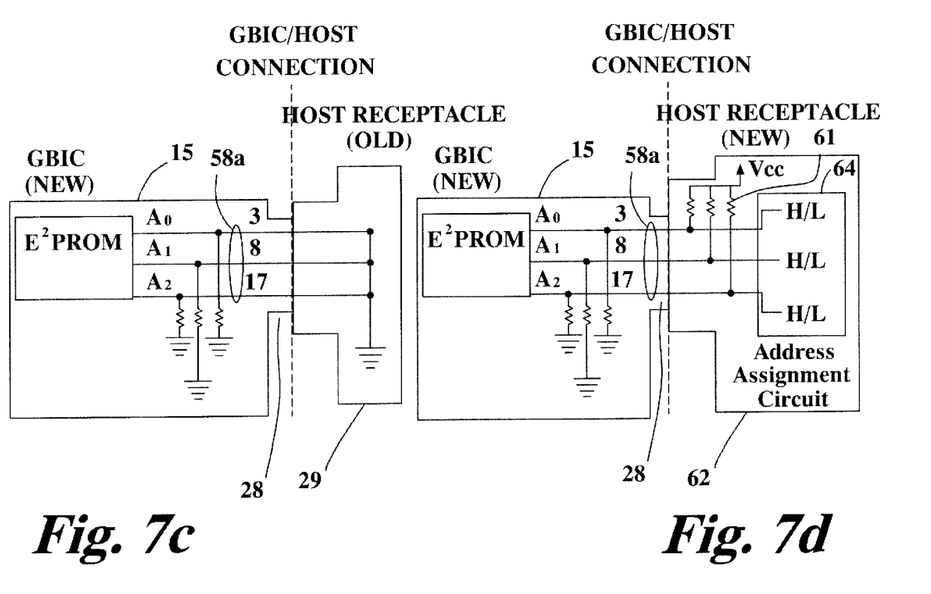
FIG. 7c is a circuit block diagram illustrating a portion (pins #3, #8, and #17) of the interface connection between a GBIC configured in accordance with the present invention and a conventional host receptacle.
FIG. 7d is a circuit block diagram illustrating a portion (pins #3, #8, and #17) of the interface connection between a GBIC and a host receptacle, both configured in accordance with the present invention.

FIG. 7c illustrates an electrical connector 28 of a GBIC module 15 configured in accordance with the present invention connected to a prior art host receptacle 29. FIG. 7c demonstrates that a GBIC 15 configured in accordance with the present invention can be plugged into a prior art host receptacle 29 and still function properly. The address lines 58a are simply grounded by the prior art host receptacle 29. This results in the GBIC 15 being assigned an address of zero, which is simply synonymous with a prior art GBIC module designation.

FIG. 7d illustrates a connection between a GBIC module 15 and a host receptacle 62, both constructed in accordance with the present invention. In this embodiment the AAC 64 of the host receptacle 62 is connected to the address lines 58a of the GBIC 15 via the electrical connection 28. The AAC 64 designates the address of the GBIC 15 by setting each of the address lines 58a to logic high or logic low, as desired by the user. In this manner the host receptacle 62 determines the address of the GBIC 15. On board pulldown resistors attached to address lines 58a are in the range of 50–100K ohms.

Figure 8A:
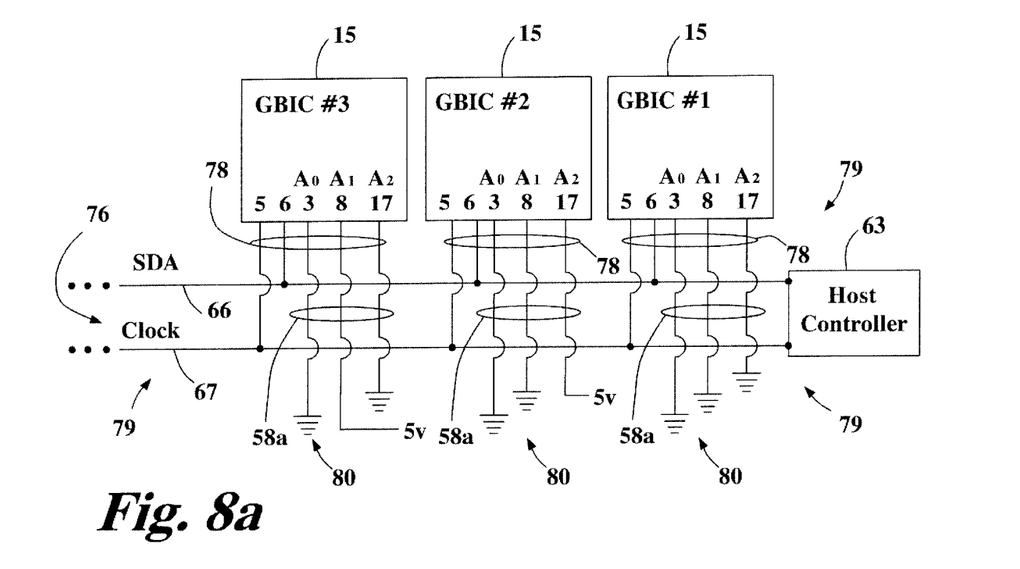
FIG. 8a illustrates multiple GBICs connected to a common I$^2$C bus of a host system, all configured in accordance with the present invention.

FIG. 8a illustrates multiple GBICs 15 connected to receptacles 78 of a host system 79. The host system 79 includes an I²C™ bus 76, comprising a serial communication bus 66 and a clock line 67, which connects to pins #6 and #5, respectively, of the electrical connector 28 of each GBIC module 15. In this embodiment electrical connections within each receptacle 78 connect the GBIC 15 to the I²C™ bus 76 and also set the address of each GBIC module 15 via pins #3, #8, #17 of the electrical connector 28 of the GBIC module 15. The address lines 58a of the GBICs 15 are set by predetermined hard-wired address designations 80 in each of the electrical connections within each receptacle 78. For example, GBIC module #1 has a binary address of zero (Low, Low, Low), GBIC module #2 has a binary address of 1 (Low, Low, High), and GBIC module #3 has a binary address of 2 (Low, High, Low). The I²C™ host controller 63 then just addresses each GBIC 15 according to its address as determined by each of the designations 80 for each host receptacle 78.

Figure 8B:
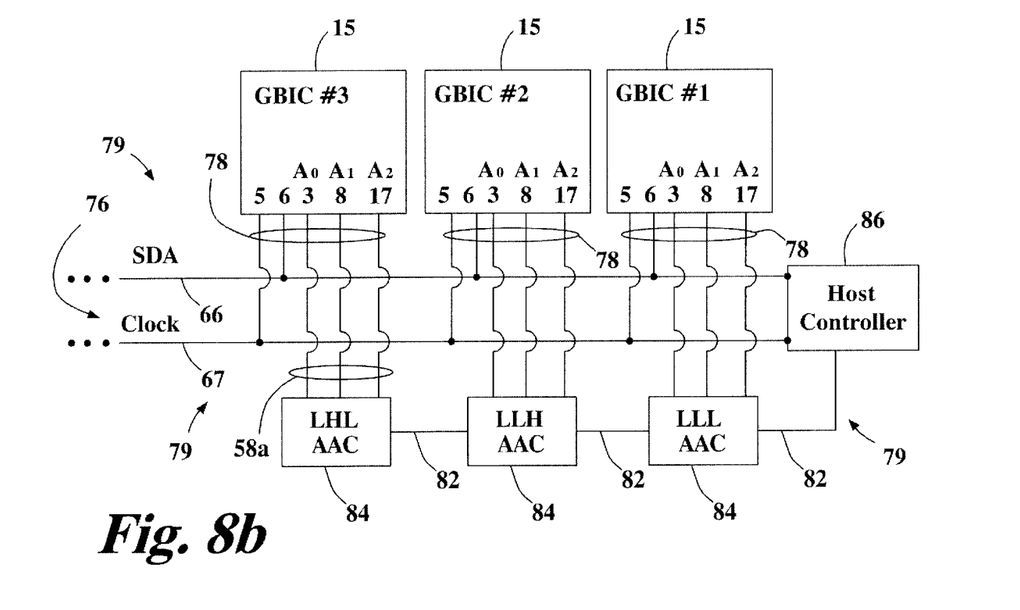
FIG. 8b illustrates multiple GBICs connected to a common I$^2$C bus of a host system, all configured in accordance with a second embodiment of the present invention.
Figure 9A:
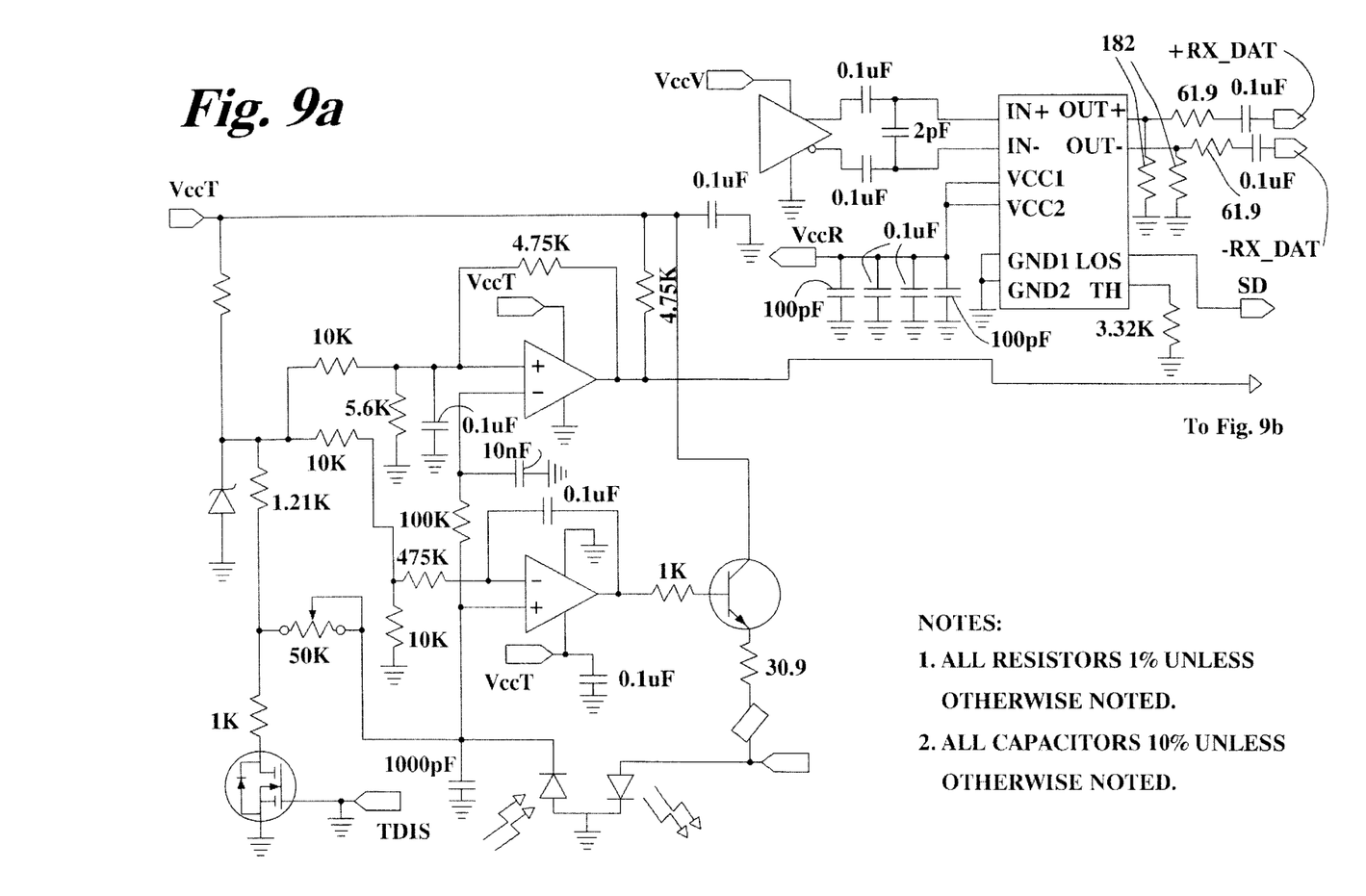
FIGS. 9a–9d are a circuit diagram of a GBIC configured in accordance with a preferred embodiment of the present invention.
Figure 9B:
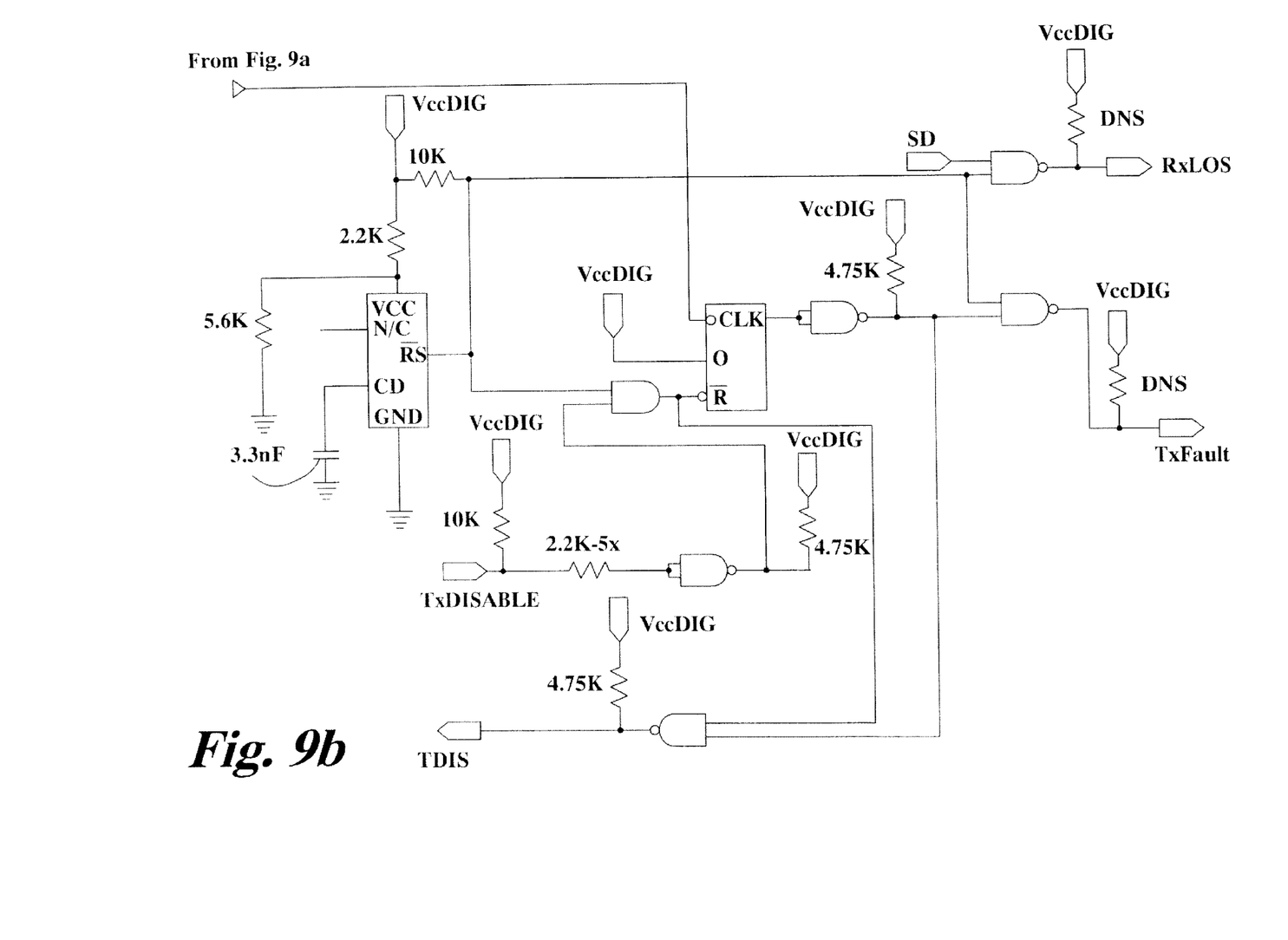
Figure 9C:
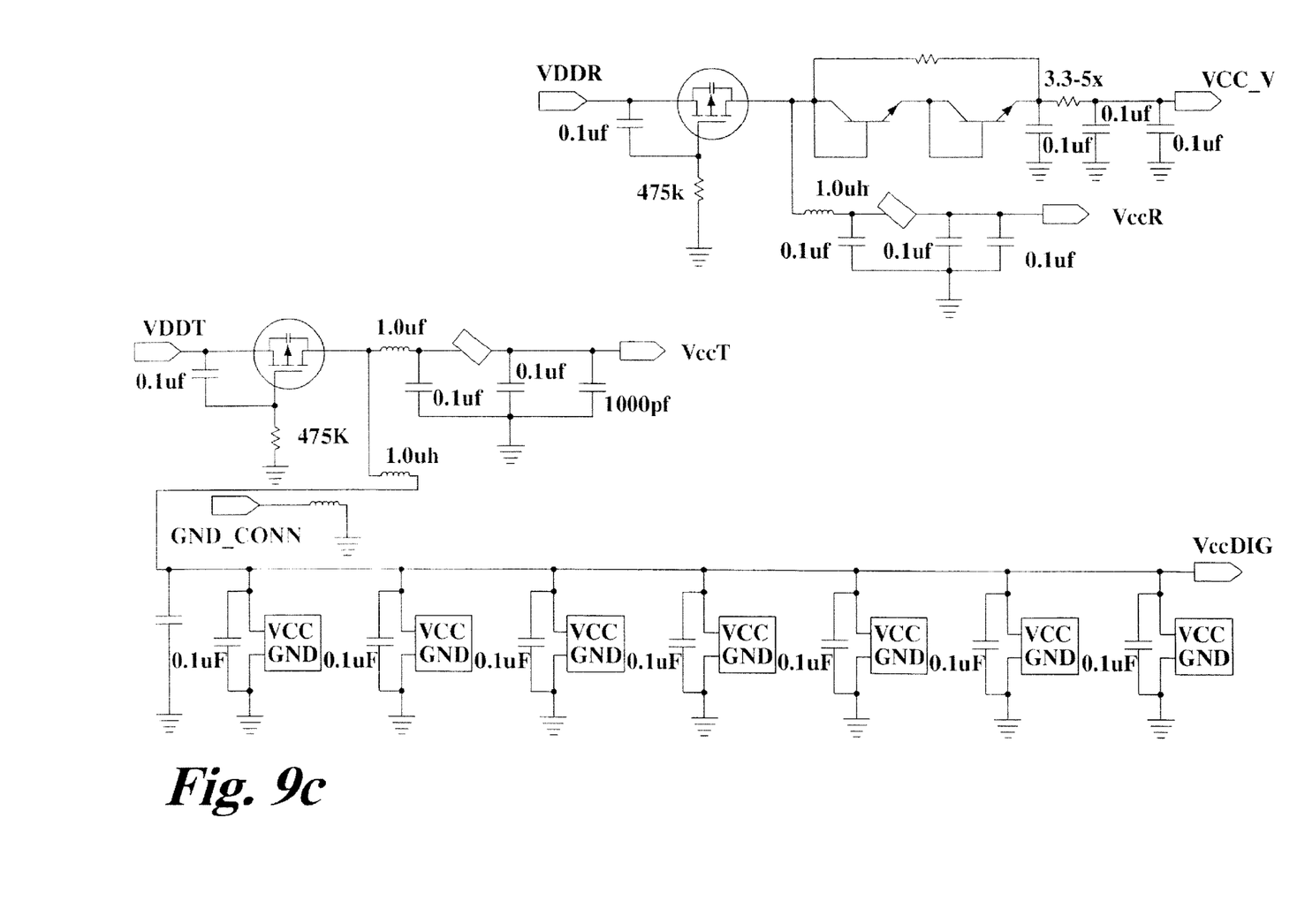
Figure 9D:
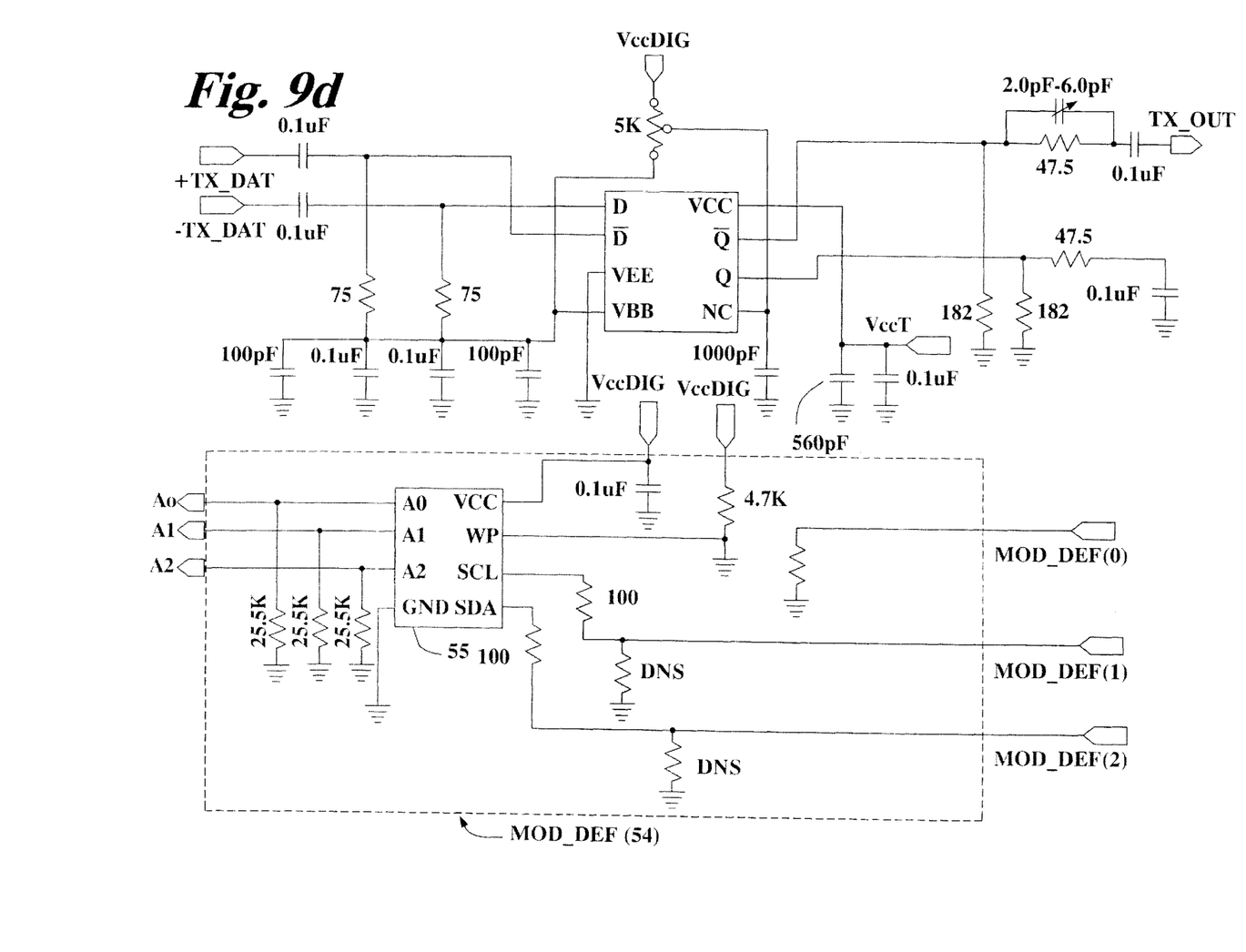

FIG. 8b illustrates a second embodiment of the present invention wherein GBICs 15 are connected to a common I²C™ bus 76 and the address of each GBIC module 15 connected to each receptacle 78 is determined by address assignment circuits (AAC) 84. The AACs 84 are connected to and controlled by the I²C™ host controller 86 via a control line 82. In this manner the host controller 86 can control and change the address designation of each GBIC 15 connected to a receptacle 78 via the AACs 84. FIG. 8b illustrates how each AAC 84 sets the address lines 58a to different logic levels to designate a unique address for each GBIC module 15. Similar to the first embodiment shown in FIG. 8a, GBIC module #1 has a binary address of zero (Low, Low, Low), GBIC module #2 has a binary address of 1 (Low, Low, High), and GBIC module #3 has a binary address of 2 (Low, High, Low). In accordance with the second embodiment of the present invention, the host controller 63 can change the address designation assigned by each AAC 84 via control line 82.

FIGS. 9a–9d are a detailed circuit diagram of a GBIC configured in accordance with the present invention. 9d illustrates the module definition circuit 54 containing the EEPROM 55 configured in accordance with the present invention.

It is to be understood that the foregoing description is merely a disclosure of particular embodiments and is no way intended to limit the scope of the invention. Several possible alterations and modifications will be apparent to those skilled in the art.

We claim as our invention:

1. An optoelectronic transceiver module, comprising:
    a housing having a first end and a second end;
    a printed circuit board mounted within the housing;
    an electrical connector on the printed circuit board at the first end of the optoelectronic transceiver module, the electrical connector having an insulative mating surface including a first side with electrical contacts in an area oriented substantially parallel to the first side of the insulative mating surface, wherein the electrical contacts slidingly engage a circuit card connector of a host receptacle in order to quickly install and remove the optoelectronic transceiver module from within the circuit card connector;
    an optical assembly on the printed circuit board at the second end of the optoelectronic transceiver module, the optical assembly including a transmitting optical subassembly and a receiving optical subassembly, the optical assembly to be coupled with a duplex fiber optic plug providing for bi-directional data transmission over an optical data link; and
    a data storage module within the housing having a configurable address corresponding to the address of the optoelectronic transceiver module and address lines electrically connected to at least some of the electrical contacts of the electrical connector, thereby enabling a host receptacle to communicate with the address lines of the data storage module via the electrical contacts of the electrical connector in order to designate an address of the optoelectronic transceiver module.

2. The optoelectronic transceiver module of claim 1, wherein the transceiver module is a GBIC configuration.

3. The optoelectronic transceiver module of claim 1, wherein the data storage module is an Electrically Erasable Programmable Read-Only Memory (EEPROM).

4. The optoelectronic transceiver module of claim 1, wherein the address lines correspond to pins #3, #8, and #17 of an SCA-20 electrical connector.

5. The optoelectronic transceiver module of claim 1, further comprising a resistor electrically connected between each address line and ground.

6. The optoelectronic transceiver module of claim 1, further comprising:
    a host receptacle for receiving the electrical connector of the optoelectronic transceiver module and electrically mating with the address lines of the optoelectronic transceiver module connector.

7. The optoelectronic transceiver module of claim 1, further comprising:
    a host receptacle having an electrical connector configured to mate with the address lines of the optoelectronic transceiver module connector.

8. The optoelectronic transceiver module of claim 7, further comprising:
    an address assignment circuit (AAC) coupled to the host receptacle that sets logic levels of each of the address lines.

9. The optoelectronic transceiver module of claim 8, further comprising:
    a resistor electrically connected between each contact of the host receptacle for mating with the address lines and a fixed voltage corresponding to a binary logic level.

10. The optoelectronic transceiver module of claim 8, wherein the logic level setting of the AAC are hardwired within the receptacle of a host system.

11. The optoelectronic transceiver module of claim 8, further comprising:
    a master host controller electrically connected to the AAC of the host receptacle, wherein the master host controller determines the logic level settings of the AAC.

12. The optoelectronic transceiver module of claim 7, further comprising:
    an I²C bus electrically connected to the host receptacle.

13. The optoelectronic transceiver module of claim 12, further comprising:
    a master host controller electrically connected to the I²C bus.

14. The optoelectronic transceiver module of claim 12, further comprising:
    a second host receptacle connected to the I²C and a second AAC connected to the second host receptacle.

15. A transceiver module, comprising:
    a housing having a first end and a second end;
    a printed circuit board mounted within the housing;
    a first electrical connector having electrical contacts on the printed circuit board at the first end of the transceiver module having a first configuration for mating with a host receptacle;
    a second electrical connector on the printed circuit board at the second end of the transceiver module having a second configuration;
    a data storage module within the housing having a configurable address corresponding to the address of the transceiver module and address lines electrically connected to at least some of the electrical contacts of the first electrical connector, wherein a host receptacle, coupled to the first electrical connector, can communicate with the address lines of the data storage module via the electrical contacts of the first electrical connector in order to designate an address for transceiver module.

16. The transceiver module of claim 15, further comprising:

a host receptacle for receiving the first electrical connector of the transceiver module and electrically mating with the address lines.

17. The transceiver module of claim 16, further comprising:

an address assignment circuit (AAC) coupled to the host receptacle that sets logic levels of each of the address lines.

18. The transceiver module of claim 17, wherein the logic level settings of the AAC are hardwired.

19. The transceiver module of claim 17, further comprising:

an I$^2$C bus electrically connected to the host receptacle.

20. The transceiver module of claim 18, further comprising:

a host controller electrically connected to the I$^2$C bus.

* * * * *